(12) United States Patent
Larkin et al.

(10) Patent No.: US 12,553,561 B2
(45) Date of Patent: Feb. 17, 2026

(54) PIPELINE CONNECTIONS

(71) Applicant: Romac Industries, Inc., Bothell, WA (US)

(72) Inventors: Joshua James Larkin, Bothell, WA (US); David Richard Albin, Bothell, WA (US); Andrew Michael Lemke, Bothell, WA (US)

(73) Assignee: Romac Industries, Inc., Bothell, WA (US)

( * ) Notice: Subject to any disclaimer, the term of this patent is extended or adjusted under 35 U.S.C. 154(b) by 151 days.

(21) Appl. No.: 17/788,701

(22) PCT Filed: Dec. 23, 2020

(86) PCT No.: PCT/US2020/066960
§ 371 (c)(1),
(2) Date: Jun. 23, 2022

(87) PCT Pub. No.: WO2021/133985
PCT Pub. Date: Jul. 1, 2021

(65) Prior Publication Data
US 2023/0021866 A1 Jan. 26, 2023

Related U.S. Application Data

(60) Provisional application No. 62/953,846, filed on Dec. 26, 2019, provisional application No. 62/959,098, filed on Jan. 9, 2020.

(51) Int. Cl.
*F16L 41/06* (2006.01)
*F16L 21/06* (2006.01)

(52) U.S. Cl.
CPC .............. *F16L 41/06* (2013.01); *F16L 21/06* (2013.01)

(58) Field of Classification Search
CPC . F16L 41/06; F16L 21/06; F16L 41/08; F16L 41/12; F16L 21/065
(Continued)

(56) References Cited

U.S. PATENT DOCUMENTS 1,027,155 A 5/1912 Robbins
1,290,041 A * 1/1919 Anderson ............. F16L 55/172
138/99
(Continued)

FOREIGN PATENT DOCUMENTS

GB 2181203 A * 4/1987 .............. F16L 47/02
JP 09152084 A * 6/1997 .............. F16L 41/06

OTHER PUBLICATIONS

Nordic Shapes, "ISIFLO tapping saddle, germany," YouTube Video, Aug. 17, 2010, URL=https://www.youtube.com/watch?V=XIgU9suH14E&t=41s, download date Jan. 18, 2023. (1 page) (Screenshot).

(Continued)

*Primary Examiner* — David Bochna
(74) *Attorney, Agent, or Firm* — Seed Intellectual Property Law Group LLP

(57) ABSTRACT

A system coupled to a pipeline includes a first portion and a second portion coupled to the first portion by an over-center latch and a secondary adjustment mechanism such that a diameter of the system can be adjusted independently by either the over-center latch or the secondary adjustment mechanism. The first portion may be coupled to the second portion by a ratchet mechanism. The system may include a service saddle or a tapping sleeve. The system may be coupled to a water main.

21 Claims, 18 Drawing Sheets

(58) Field of Classification Search
USPC .................................. 285/197, 198, 199, 409
See application file for complete search history.

(56) References Cited

U.S. PATENT DOCUMENTS

| | | | | |
|---|---|---|---|---|
| 2,239,651 | A * | 4/1941 | McMurray | F16L 41/12 29/525 |
| 2,689,141 | A * | 9/1954 | Kiekhaefer | F16L 23/06 285/410 |
| 2,775,806 | A | 1/1957 | Love | |
| 2,901,271 | A | 8/1959 | Zoldak | |
| 3,011,755 | A * | 12/1961 | Babson | F16L 41/12 251/146 |
| 3,090,260 | A * | 5/1963 | Brooks | F16L 41/06 24/271 |
| 4,761,024 | A * | 8/1988 | Ewen | F16L 47/02 137/318 |
| 4,768,741 | A * | 9/1988 | Logsdon | E21F 17/02 248/230.8 |
| 6,454,312 | B1 * | 9/2002 | Desorcy | F16L 41/12 248/62 |
| 6,622,347 | B1 | 9/2003 | Cottrill et al. | |
| 8,469,060 | B2 | 6/2013 | Robinson | |
| 9,206,935 | B2 | 12/2015 | Senter, Jr. | |
| 10,024,475 | B2 * | 7/2018 | Jungmann | F16L 41/065 |
| 2003/0030275 | A1 * | 2/2003 | Nicolini | F16L 37/008 285/376 |
| 2004/0207199 | A1 | 10/2004 | Greco | |
| 2008/0136167 | A1 | 6/2008 | Heelan et al. | |
| 2011/0290360 | A1 | 12/2011 | Robinson | |
| 2017/0261143 | A1 * | 9/2017 | Boyes | F16L 41/12 |
| 2020/0141524 | A1 * | 5/2020 | Pearman | F16L 21/06 |
| 2021/0140575 | A1 * | 5/2021 | Peterson | F16L 41/12 |
| 2021/0156407 | A1 * | 5/2021 | Kong | F16L 21/06 |

OTHER PUBLICATIONS

Valley Precise Global, "Milspec 20Bar Clamp Application. Emergency Rapid Response Pipe Repair," YouTube Video, Jan. 18, 2023, URL=https://www.youtube.com/watch?V=Zmn-sgrNkM, download date Jan. 18, 2023. (1 page) (Screenshot).

Valley Precise Global, "Rapid Response SDR11 Clamp," SDR-11 Clamp brochure, 2 pages.

* cited by examiner

PIPELINE CONNECTIONS

BACKGROUND

Technical Field

The present disclosure relates generally to pipeline connections, such as pipeline branch connections such as service saddles and tapping sleeves, having new connection and adjustment mechanisms.

Description of the Related Art

Service saddles are used to install joints and valves in water mains, such as to connect new homes to existing municipal water supplies. Tapping sleeves have features in common with service saddles, but where service saddles typically provide a threaded outlet and/or connection to other components, tapping sleeves typically provide a flanged outlet and/or connection to other components.

SUMMARY

A system may be summarized as comprising: a service saddle having a first end portion and a second end portion opposite to the first end portion of the service saddle; a strap having a first end portion and a second end portion opposite to the first end portion of the strap, wherein the first end portion of the strap is coupled to the first end portion of the service saddle and the second end portion of the strap is coupled to the second end portion of the service saddle by an over-center latch; and an adjustment mechanism configured to adjust a connection of the second end portion of the strap to the second end portion of the service saddle; wherein a dimension of the system can be adjusted independently by either the over-center latch or the adjustment mechanism.

The first end portion of the service saddle may include a groove and the first end portion of the strap may include a rod positioned in the groove. The first end portion of the service saddle may include a fork and the first end portion of the strap may include a bolt that extends through the fork. The second end portion of the strap may be coupled to the second end portion of the service saddle by the over-center latch and a ratchet. The second end portion of the service saddle may include a first aperture and the second end portion of the strap may extend though the first aperture. The first aperture may have a variable diameter that increases toward the second end portion of the service saddle. A portion of the strap located inside the first aperture may have a variable diameter that decreases toward the second end portion of the strap. The system may further comprise a lever assembly including a lever rotatably coupled to the second end portion of the service saddle and a second aperture rotatably coupled to the lever, wherein the second end portion of the strap extends through the second aperture. The second aperture may have a variable diameter that increases toward the second end portion of the service saddle. A portion of the strap located inside the second aperture may have a variable diameter that decreases toward the second end portion of the strap. The second end portion of the strap may be serrated. The second end portion of the strap may be saw-toothed. The system may further comprise a lever assembly including a lever rotatably coupled to the second end portion of the service saddle and bar rotatably coupled to the lever. The second end portion of the strap may include a groove and the bar may be located within the groove. The second end portion of the strap may include a plurality of grooves and the bar may be located within one of the grooves. The system may further comprise a lever assembly including a lever rotatably coupled to the second end portion of the service saddle and an aperture rotatably coupled to the lever, wherein the second end portion of the strap extends through the aperture. The second end portion of the strap may include a flange that prevents the second end portion of the strap from moving through the aperture in a direction toward the second end portion of the service saddle. The system may be coupled to a water main. The dimension of the system may be a diameter of the system.

A system may be summarized as comprising: a service saddle having a first end portion and a second end portion opposite to the first end portion; and a strap having a first end portion and a second end portion opposite to the first end portion of the strap, wherein the first end portion of the strap is coupled to the first end portion of the service saddle and the second end portion of the strap is coupled to the second end portion of the service saddle by a ratchet. The system may be coupled to a water main. The system may have a variable diameter.

A system may be summarized as comprising: a service saddle; a strap coupled to the service saddle; and an adjustable latch; wherein the system is configured to be mounted on a plurality of different pipes having a plurality of different diameters. The system may be coupled to a water main. The system may be a pipeline branch connection.

A system may be summarized as comprising: a service saddle; a strap coupled to the service saddle; a latch; and an adjustment mechanism configured to adjust a dimension of the system independently of the latch.

The system may be coupled to a water main. The latch may include an over-centering clamp configured to tighten the system on a pipeline. The latch may be releasable. The adjustment mechanism may include a climbing mechanism. The adjustment mechanism may include a ratchet. The service saddle may be configured to receive one of a plurality of different interchangeable outlet components. Each of the different interchangeable outlet components may be threaded and may have thread dimensions that are different than each of the other interchangeable outlet components. The service saddle may be configured to prevent pullout of the interchangeable outlet components from the system when the system is in use. The service saddle may include a hydrostatic gasket. The service saddle may include an active gasket. The service saddle may include a gasket configured to create a seal against fluid at pressures of up to 300 pounds per square inch. The service saddle may include a gasket configured to create a seal that strengthens as fluid pressure against the gasket increases. An effective length of the strap may be adjustable. A connection of the strap to the service saddle may be adjustable. The latch may be located in a center portion of the strap at a location opposite to the service saddle. The latch may be lever-actuated. The service saddle may include a hinge.

A system may be summarized as comprising: a service saddle having a first end portion and a second end portion opposite to the first end portion of the service saddle; a strap having a first end portion and a second end portion opposite to the first end portion of the strap, wherein the first end portion of the strap is coupled to the first end portion of the service saddle and the second end portion of the strap is coupled to the second end portion of the service saddle; an adjustment mechanism configured to adjust a connection of the second end portion of the strap to the second end portion of the service saddle; and an adjustable catch; wherein a dimension of the system can be adjusted independently by either the adjustment mechanism or the adjustable catch.

The system may be coupled to a water main. The service saddle may include the adjustable catch. The strap may include the adjustable catch. The connection of the first end portion of the strap to the first end portion of the service saddle may include a pin engaged in a notch. The connection of the second end portion of the strap to the second end portion of the service saddle may include a pin engaged in a notch.

A system may be summarized as comprising: a pipeline branch connection including a first portion and a second portion coupled to the first portion by an over-center latch; and an adjustment mechanism configured to adjust a connection of the second portion to the first portion; wherein a dimension of the system can be adjusted independently by either the over-center latch or the adjustment mechanism. The pipeline branch connection may include a service saddle. The pipeline branch connection may include a tapping sleeve. The second portion may be coupled to the first portion by the over-center latch and a ratchet. The system may be coupled to a water main. The dimension of the system may be a diameter of the system.

A system may be summarized as comprising: a pipeline branch connection including a first portion and a second portion coupled to the first portion by a ratchet, wherein the first portion and the second portion collectively form a loop, and wherein a dimension of the system can be adjusted by the ratchet. The pipeline branch connection may include a service saddle. The pipeline branch connection may include a tapping sleeve. The system may be coupled to a water main. The dimension of the system may be a diameter of the loop.

A system may be summarized as comprising: a pipeline branch connection including an adjustable latch; wherein the system is configured to be mounted on a plurality of different pipes having a plurality of different diameters. The system may be coupled to a water main. The pipeline branch connection may include a service saddle. The pipeline branch connection may include a tapping sleeve.

A system may be summarized as comprising: a pipeline branch connection including a first portion and a second portion coupled to the first portion; a latch; and an adjustment mechanism configured to adjust a dimension of the system independently of the latch. The pipeline branch connection may include a service saddle. The pipeline branch connection may include a tapping sleeve. The system may be coupled to a water main. The dimension of the system may be a diameter of the system. The latch may include an over-centering clamp configured to tighten the system on a pipeline. The latch may be releasable. The adjustment mechanism may include a climbing mechanism. The adjustment mechanism may include a ratchet. The pipeline branch connection may be configured to receive one of a plurality of different interchangeable outlet components. The latch may be lever-actuated.

A system may be summarized as comprising: a pipeline branch connection having a first portion and a second portion coupled to the first portion; an adjustment mechanism configured to adjust a connection of the second portion to the first portion; and an adjustable catch; wherein a dimension of the system can be adjusted independently by either the adjustment mechanism or the adjustable catch. The pipeline branch connection may include a service saddle. The pipeline branch connection may include a tapping sleeve. The system may be coupled to a water main. The dimension of the system may be a diameter of the system.

A system coupled to a pipeline may be summarized as comprising: a first portion and a second portion coupled to the first portion by an over-center latch such that the system extends around the pipeline; and an adjustment mechanism configured to adjust a connection of the second portion to the first portion; wherein a dimension of the system can be adjusted by the adjustment mechanism independently of the over-center latch.

The system may include a tapped or non-tapped service saddle. The system may include a tapping sleeve. The first portion of the system may be a service saddle having a first end portion and a second end portion opposite to the first end portion of the service saddle and the second portion of the system may be a strap having a first end portion and a second end portion opposite to the first end portion of the strap, wherein the first end portion of the strap is coupled to the first end portion of the service saddle and the second end portion of the strap is coupled to the second end portion of the service saddle by the over-center latch. The first end portion of the service saddle may include a groove and the first end portion of the strap may include a rod positioned in the groove. The first end portion of the service saddle may include a fork and the first end portion of the strap may include a bolt that extends through the fork. The second end portion of the strap may be coupled to the second end portion of the service saddle by the over-center latch and a ratchet.

The second end portion of the service saddle may include a first aperture and the second end portion of the strap may extend though the first aperture. The first aperture may have a variable diameter that increases toward the second end portion of the service saddle. A portion of the strap located inside the first aperture may have a variable diameter that decreases toward the second end portion of the strap. The system may further comprise a lever assembly including a lever rotatably coupled to the second end portion of the service saddle and a second aperture rotatably coupled to the lever, wherein the second end portion of the strap extends through the second aperture. The second aperture may have a variable diameter that increases toward the second end portion of the service saddle. A portion of the strap located inside the second aperture may have a variable diameter that decreases toward the second end portion of the strap.

The second end portion of the strap may be serrated. The second end portion of the strap may be saw-toothed. The system may further comprise a lever assembly including a lever rotatably coupled to the second end portion of the service saddle and bar rotatably coupled to the lever. The second end portion of the strap may include a groove and the bar may be located within the groove. The second end portion of the strap may include a plurality of grooves and the bar may be located within one of the grooves. The system may further comprise a lever assembly including a lever rotatably coupled to the second end portion of the service saddle and an aperture rotatably coupled to the lever, wherein the second end portion of the strap extends through the aperture. The second end portion of the strap may include a flange that prevents the second end portion of the strap from moving through the aperture in a direction toward the second end portion of the service saddle. The pipeline may be a water main. The dimension of the system may be a diameter of the system.

A system coupled to a pipeline may be summarized as comprising: a first portion and a second portion coupled to the first portion by a ratchet, wherein the first portion and the second portion collectively form a loop around the pipeline, and wherein a dimension of the system can be adjusted by the ratchet.

The system may include a service saddle. The system may include a tapping sleeve. The first portion may be a service saddle having a first end portion and a second end portion opposite to the first end portion of the service saddle and the second portion may be a strap having a first end portion and a second end portion opposite to the first end portion of the strap, wherein the first end portion of the strap is coupled to the first end portion of the service saddle and the second end portion of the strap is coupled to the second end portion of the service saddle by the ratchet. The pipeline may be a water main. The dimension of the system may be a diameter of the system.

A system coupled to a pipeline may be summarized as comprising: a first portion and a second portion coupled to the first portion by a non-threaded compression mechanism such that the system extends around the pipeline; wherein the system is configured such that a circumferential dimension of the system can be adjusted independently of the non-threaded compression mechanism by adjustment of a connection of the second portion to the first portion.

A system coupled to a pipeline may be summarized as comprising: a first portion and a second portion coupled to the first portion by a compression mechanism such that the system extends around the pipeline; wherein the system is configured such that a circumferential dimension of the system can be adjusted independently of the compression mechanism by adjustment of a non-threaded connection of the second portion to the first portion. The compression mechanism may be a non-threaded compression mechanism.

DETAILED DESCRIPTION

Figure 1:
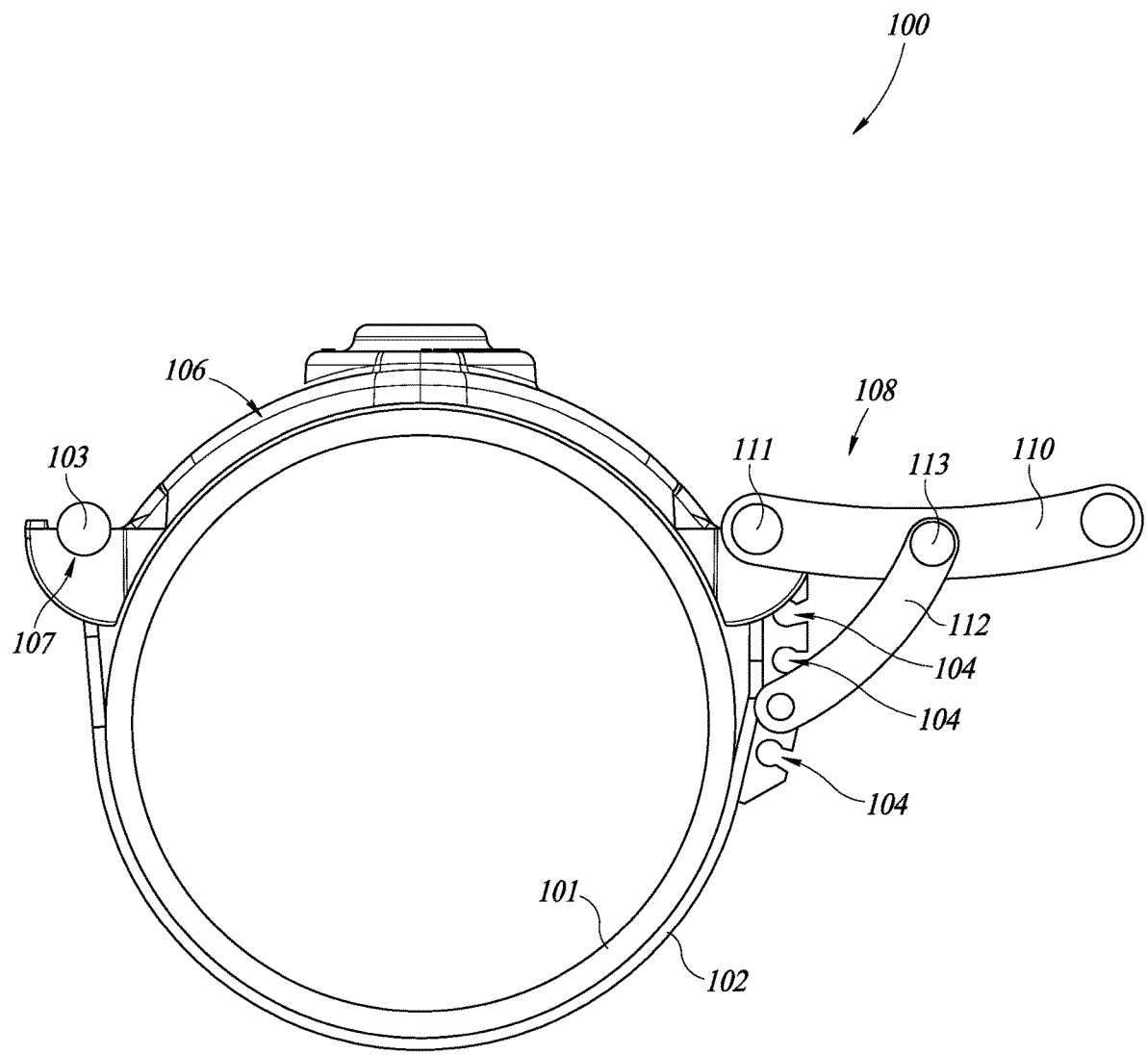
FIG. 1 illustrates a longitudinal end view of a first system including a pipeline service saddle.
Figure 2:
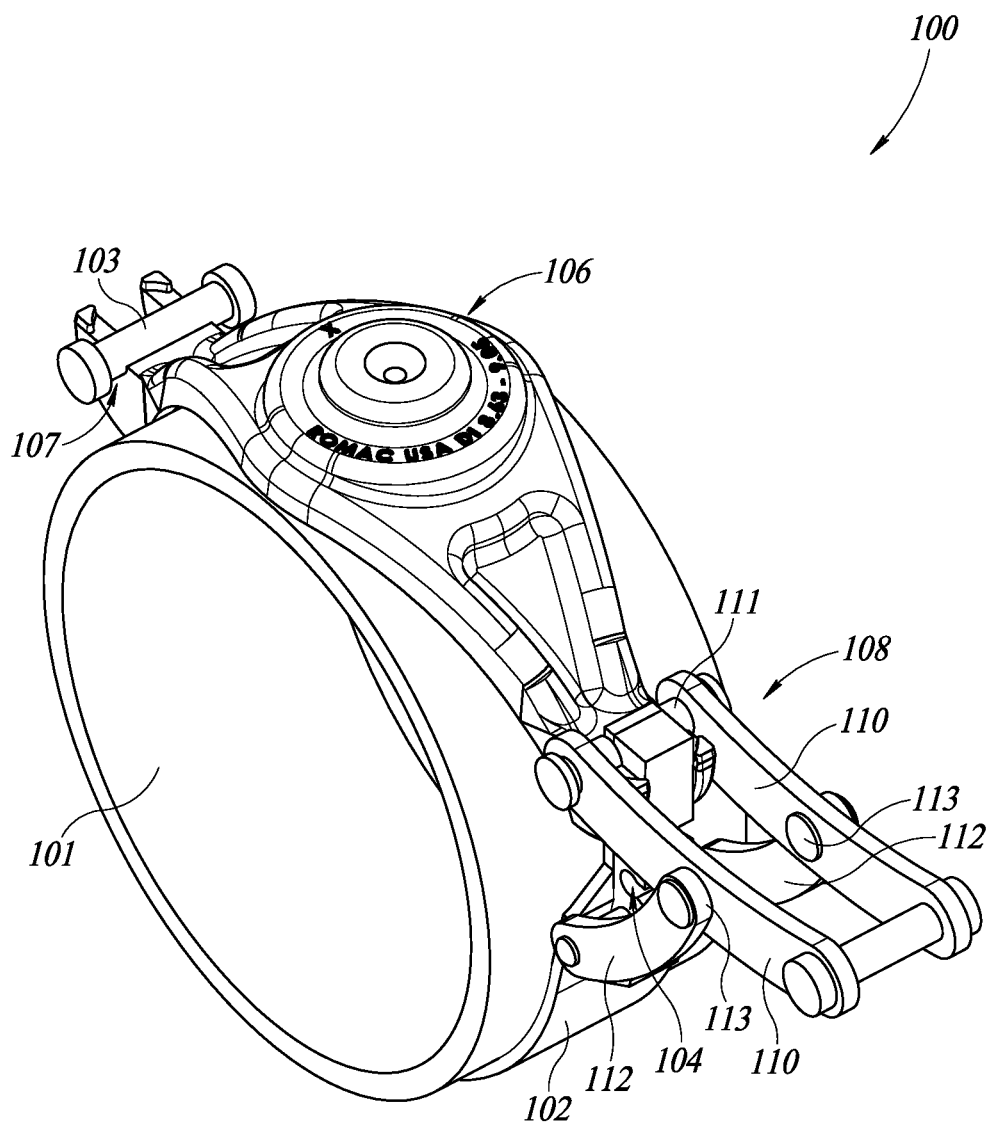
FIG. 2 illustrates a first perspective view of the system of FIG. 1.
Figure 3:
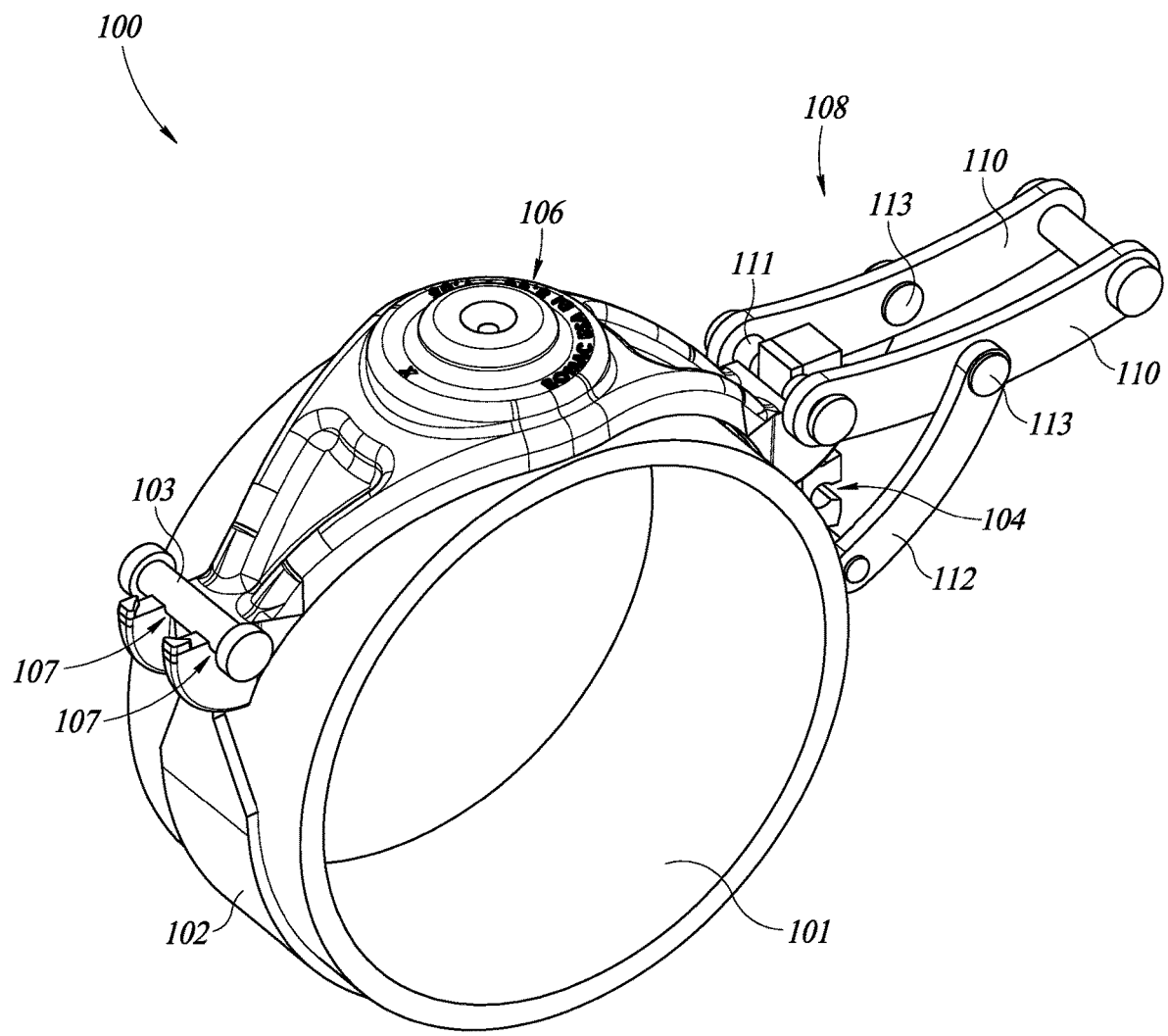
FIG. 3 illustrates a second perspective view of the system of FIG. 1.
Figure 4:
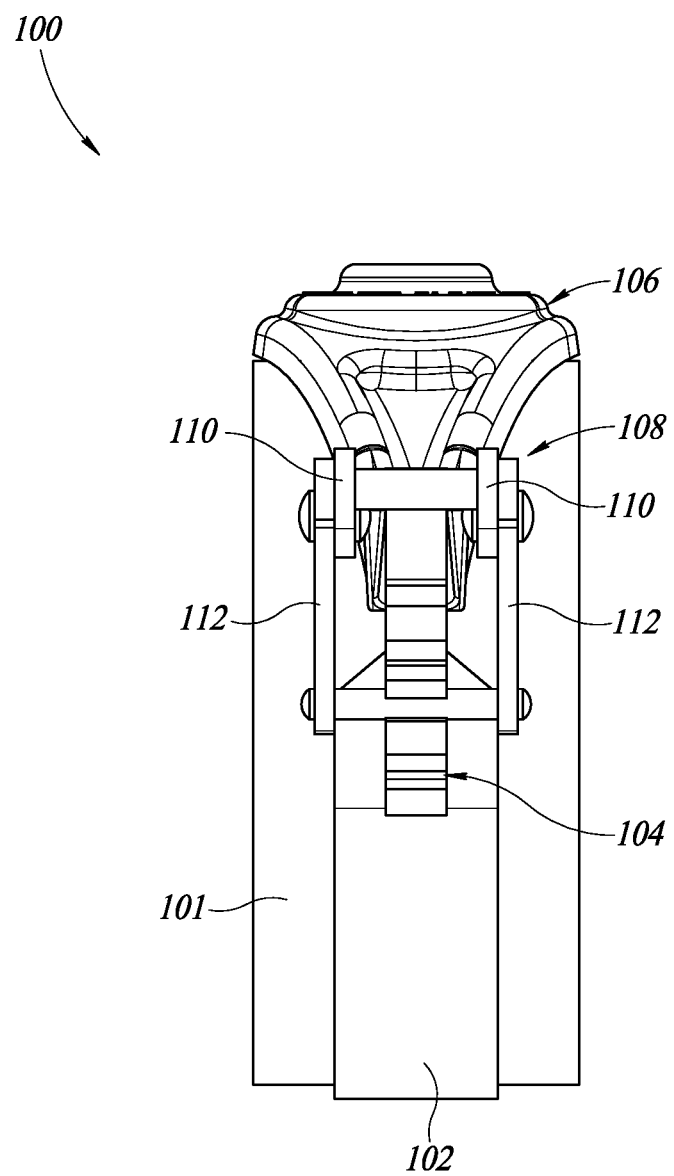
FIG. 4 illustrates a side view of the system of FIG. 1.
Figure 5:
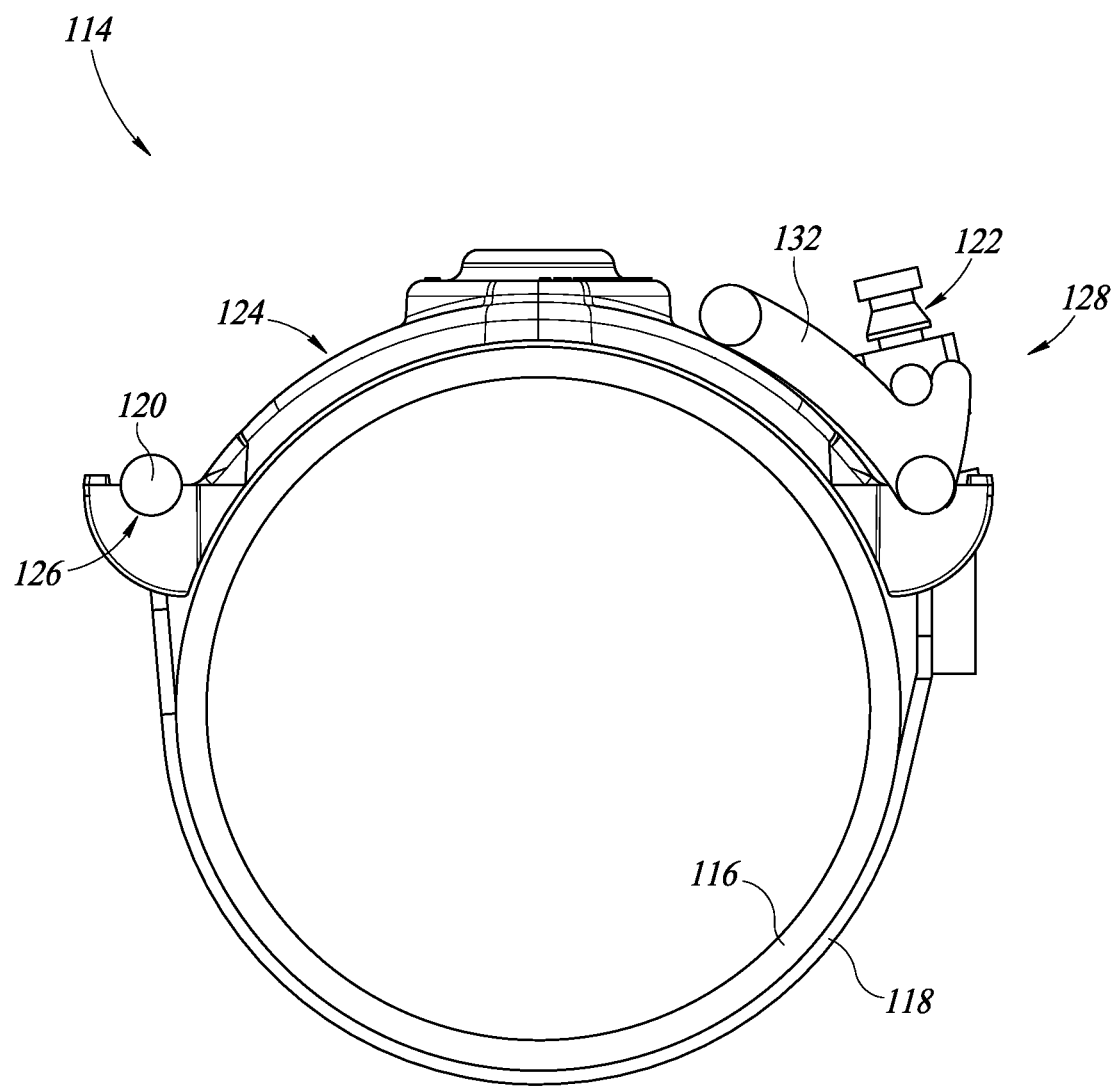
FIG. 5 illustrates a longitudinal end view of a second system including a pipeline service saddle.
Figure 6:
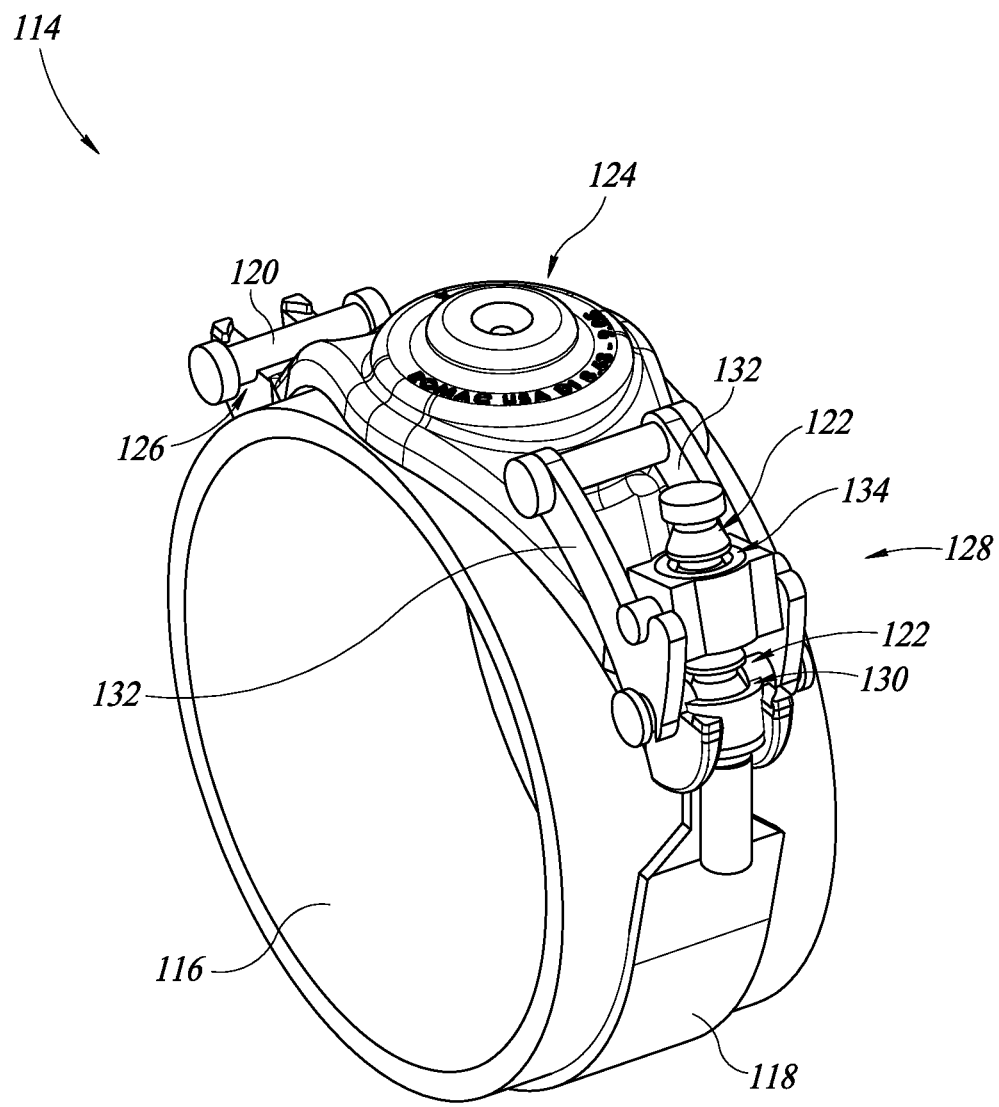
FIG. 6 illustrates a first perspective view of the system of FIG. 5.
Figure 7:
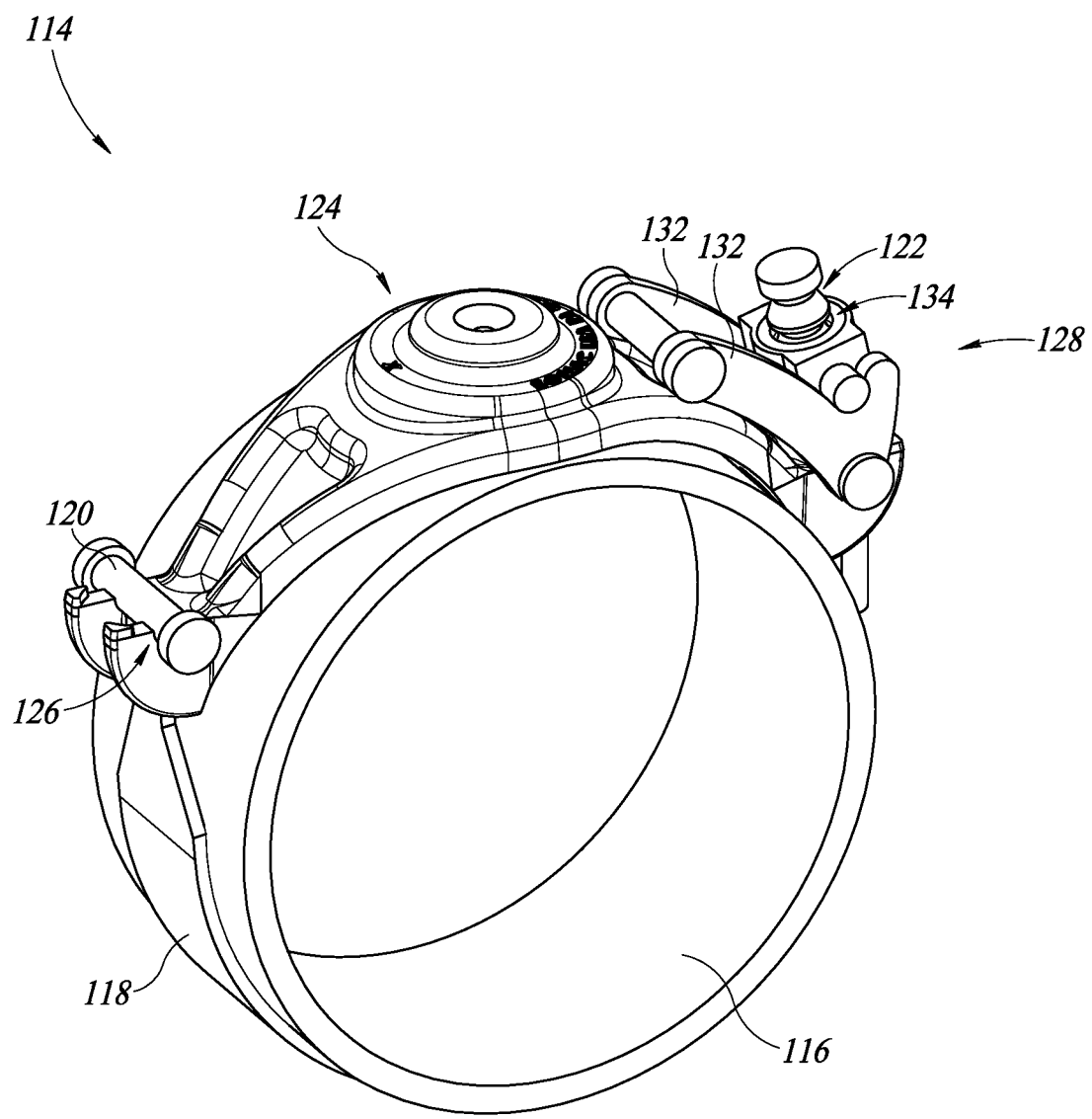
FIG. 7 illustrates a second perspective view of the system of FIG. 5.
Figure 8:
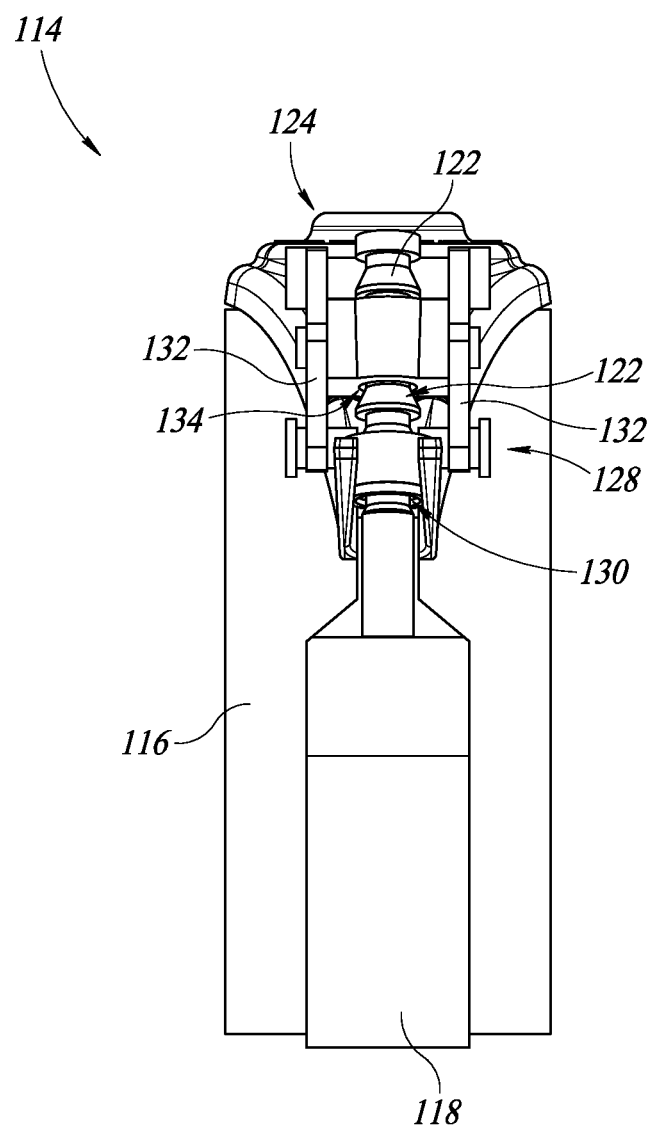
FIG. 8 illustrates a side view of the system of FIG. 5.
Figure 9:
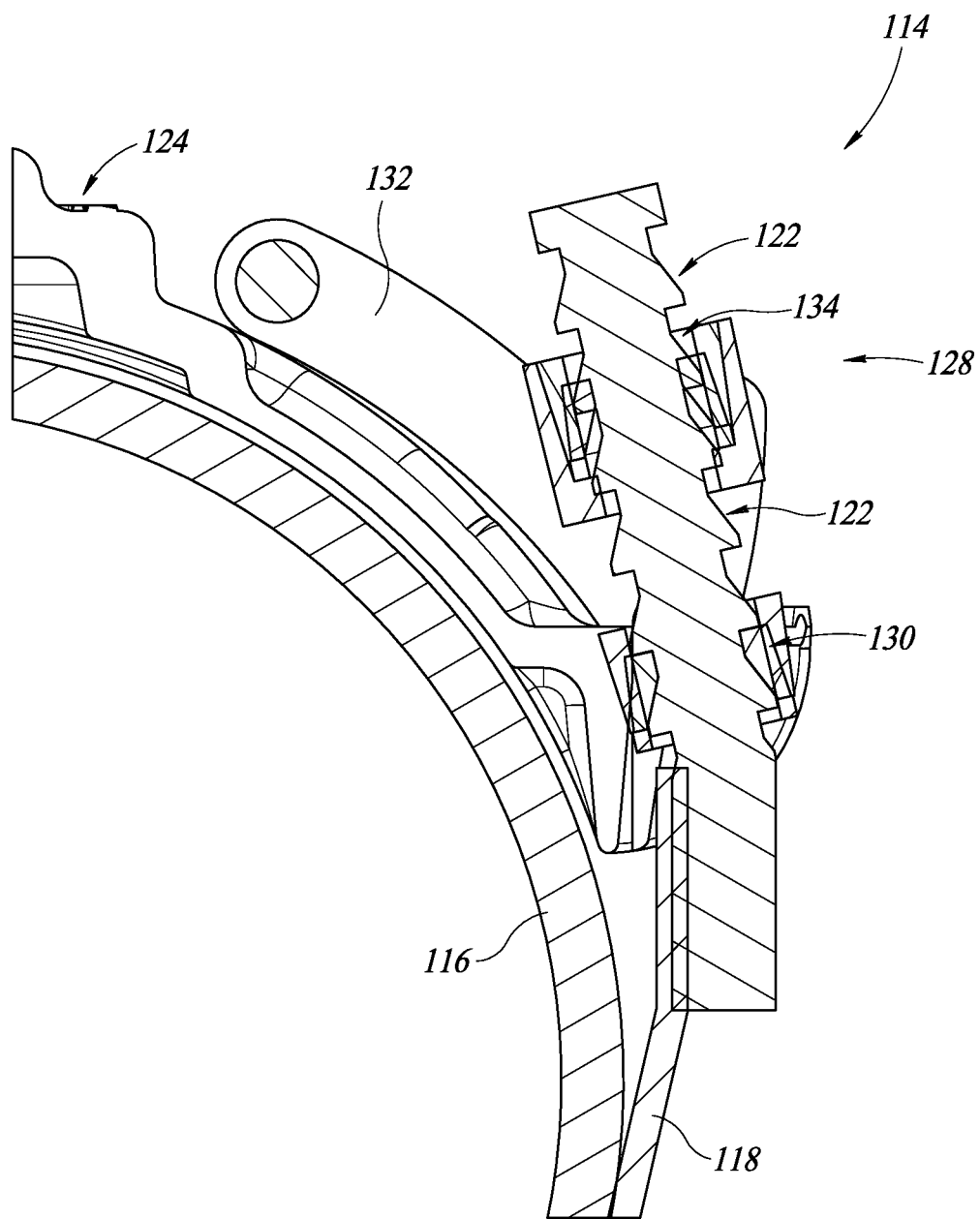
FIG. 9 illustrates a cross-sectional longitudinal end view of a portion of the system of FIG. 5, including a connection mechanism thereof.
Figure 10:
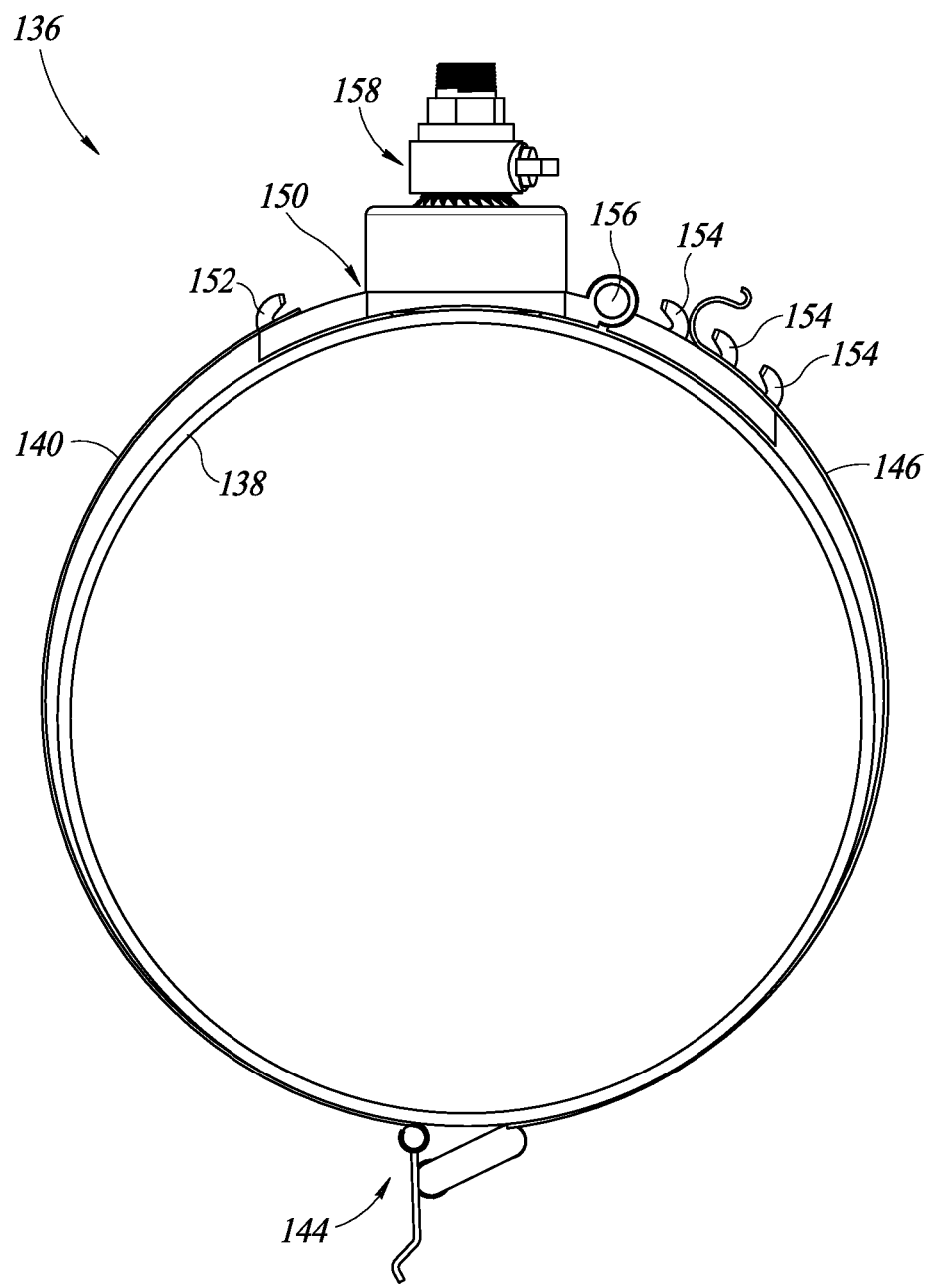
FIG. 10 illustrates a longitudinal end view of a third system including a pipeline service saddle.
Figure 11:
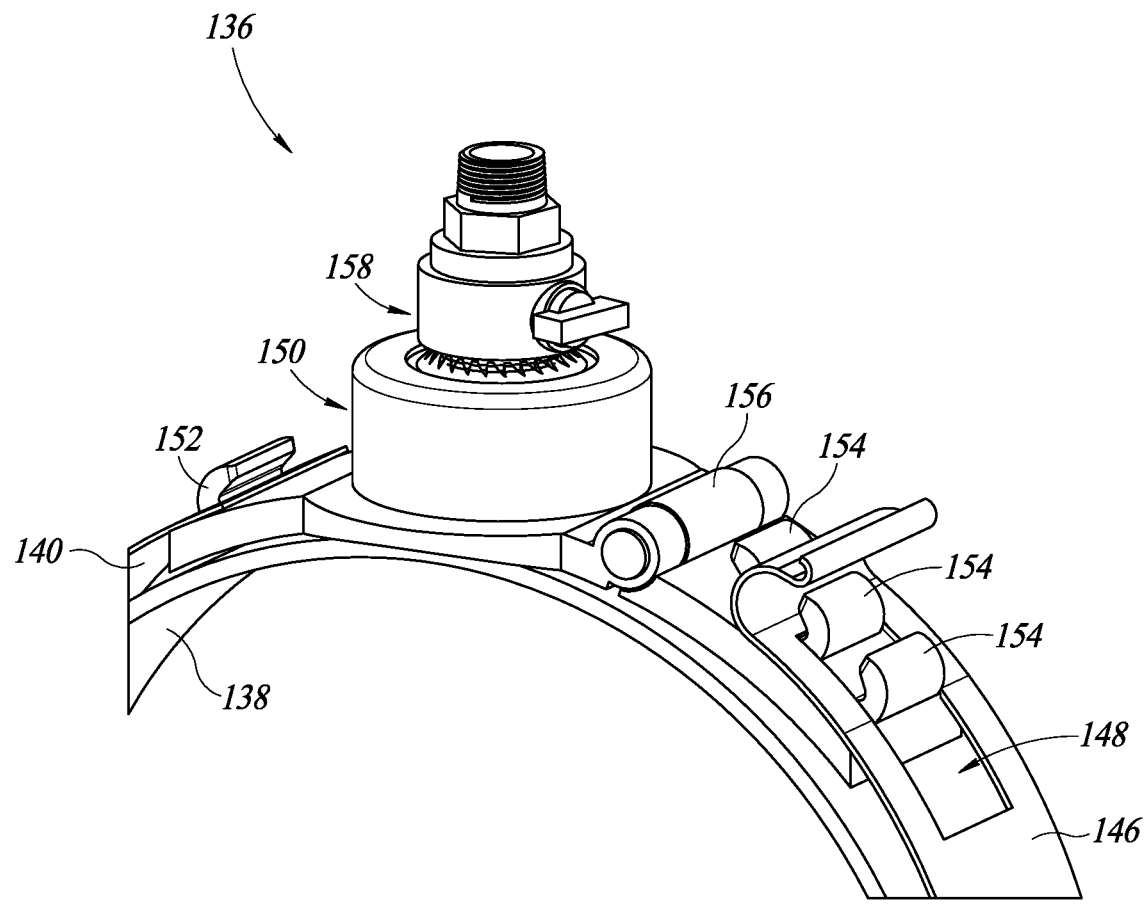
FIG. 11 illustrates a perspective view of a portion of the system of FIG. 10.
Figure 12:
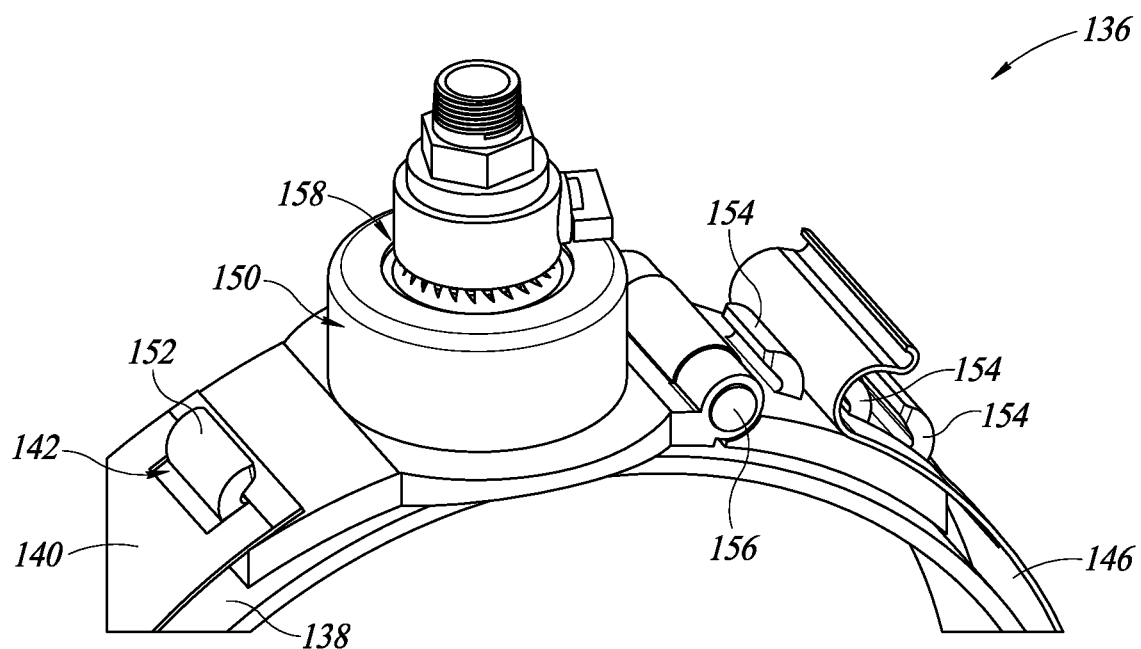
FIG. 12 illustrates another perspective view of a portion of the system of FIG. 10.
Figure 13:
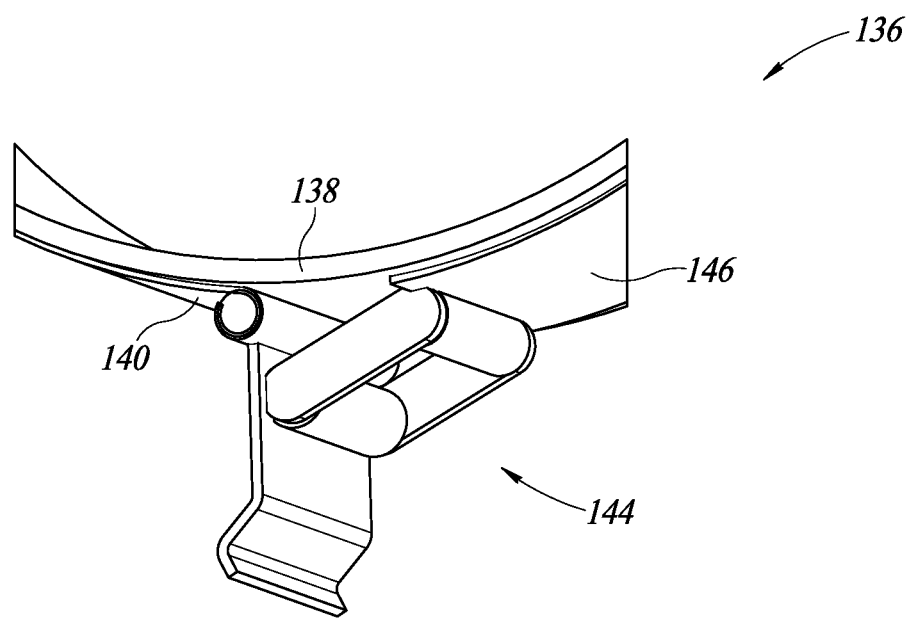
FIG. 13 illustrates another perspective view of a portion of the system of FIG. 10.
Figure 14:
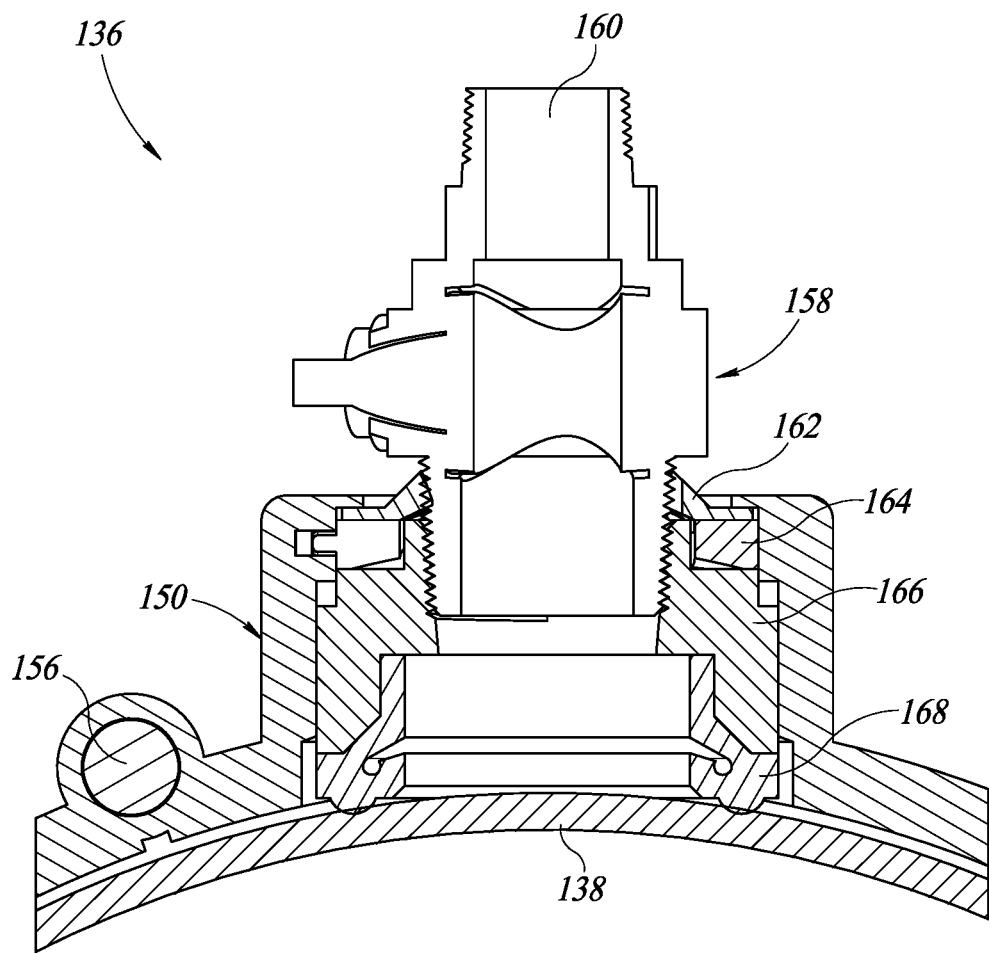
FIG. 14 illustrates a cross-sectional longitudinal end view of a portion of the system of FIG. 10.
Figure 15:
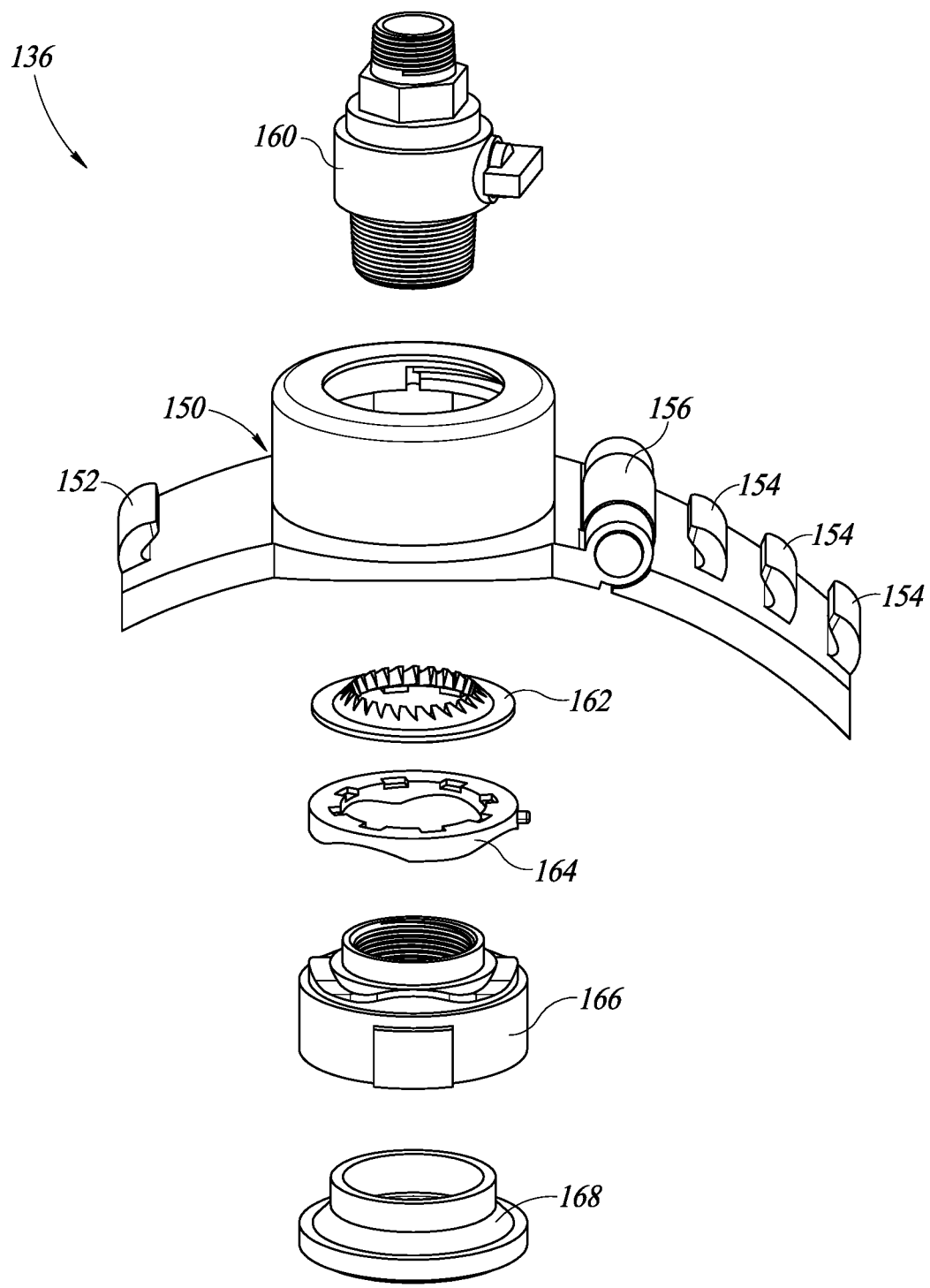
FIG. 15 illustrates an exploded view of a portion of the system of FIG. 10.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with the technology have not been shown or described in detail to avoid unnecessarily obscuring descriptions of the embodiments.

FIGS. 1-4 illustrate various views of a first system 100 mounted on, and encircling, a pipeline 101. The first system 100 includes a strap 102 having a first end including a bar 103 and a second end including a plurality of grooves 104. The first system 100 also includes a pipeline service saddle 106 having a first end including one or more grooves 107 configured to receive the bar 103, and a second end including an over-center latch mechanism 108. The over-center latch mechanism 108 includes a lever 110 rotatably coupled at a first joint 111 at a first end thereof to a main body of the pipeline service saddle 106 and rotatably coupled at a second joint 113 at an approximate midpoint thereof to a first end of a bar 112. A second end of the bar 112 opposite to the first end thereof is configured to securely fit within one of the plurality of grooves 104 in the strap 102.

To use the over-center latch mechanism 108 to secure the system 100 to the pipeline 101, an operator can grasp the lever 110 at a second end thereof opposite to the first end thereof and pull toward the pipeline service saddle 106 and away from the strap 102. To release the over-center latch mechanism 108 to remove the system 100 from the pipeline 101, the operator can grasp the lever 110 at the second end thereof and pull toward the strap 102 and away from the pipeline service saddle 106. The plurality of grooves 104 and the bar 112 can form a connection or a buckle between the strap 102 and the pipeline service saddle 106. The plurality of grooves 104 provides a first, coarse adjustment mechanism for the system 100, and the over-center latch 108 may provide a second, fine adjustment mechanism for the system 100. In alternative embodiments, a tapping sleeve may be provided with or combined with any of the features of the first system 100 illustrated in FIGS. 1-4.

FIGS. 5-9 illustrate various views of a second system 114 mounted on, and encircling, a pipeline 116. The second system 114 includes a strap 118 having a first end including a bar 120 and a second end including a plurality of teeth or serrations 122. The second system 114 also includes a pipeline service saddle 124 having a first end including one or more grooves 126 configured to receive the bar 120 and a second end including an over-center latch and dual ratchet mechanism 128. The over-center latch and dual ratchet mechanism 128 includes a first aperture 130 in a main body of the pipeline service saddle 124 and a lever 132 rotatably coupled at a first end thereof to the main body of the pipeline service saddle 124, the lever 132 having a second aperture 134. Both of the first aperture 130 and the second aperture 134 are configured to snugly receive the portion of the strap 118 including the teeth or serrations 122. Each of the first and second apertures 130, 134 has a variable diameter that increases toward the second end portion of the service saddle 124, and the strap 118 has a respective portion located inside each of the first and second apertures, each of such portions having a variable diameter that decreases toward the second end portion of the strap.

To use the over-center latch and dual ratchet mechanism 128 to secure the system 114 to the pipeline 116, an operator can grasp the lever 132 at a second end thereof opposite to the first end thereof and pull toward the pipeline service saddle 124 and away from the strap 118. Doing so pulls the serrations 122 through the first aperture 130 toward the pipeline service saddle 124. To use the over-center latch and dual ratchet mechanism 128 to further secure or tighten the system 114 to the pipeline 116, an operator can grasp the lever 132 at the second end thereof and first push toward the strap 118 and away from the pipeline service saddle 124 and second pull toward the pipeline service saddle 124 and away from the strap 118. Doing so first pushes the second aperture 134 over the serrations 122 and second pulls the serrations 122 further through the first aperture 130 toward the pipeline service saddle 124. The serrations 122 and the first and second apertures 130 and 134 form a connection between the strap 118 and the pipeline service saddle 124. The teeth or serrations 122 provide a first, coarse adjustment mechanism for the system 114, and the over-center latch and dual ratchet mechanism 128 may provide a second, fine adjustment mechanism for the system 114. In alternative embodiments, a tapping sleeve may be provided with or combined with any of the features of the second system 114 illustrated in FIGS. 5-9.

FIGS. 10-15 illustrate various views of a third system 136 mounted on, and encircling, a pipeline 138. The third system 136 includes a first strap 140 having a first end including a first aperture, hole, or slot 142 and a second end coupled to an over-center latch mechanism 144. The third system 136 also includes a second strap 146 having a first end including a second aperture, hole, or slot 148, and a second end coupled to the over-center latch mechanism 144. Thus, the first and second straps 140, 146 can together collectively form a single strap having the over-center latch mechanism 144 in a center portion thereof. The third system 136 also includes a pipeline service saddle 150 opposite to the over-center latch mechanism 144. The pipeline service saddle 150 has a first end including a protrusion 152 forming a groove configured to receive a portion of the first end of the first strap 140 such that the protrusion 152 extends through the first slot 142 to secure the first end of the first strap 140 to the first end of the pipeline service saddle 150. The pipeline service saddle 150 also has a second end opposite the first end, the second end including a plurality of protrusions 154 circumferentially spaced apart from one another and separated from the rest of, or from a main body of, the pipeline service saddle 150 by a hinge 156. Each of the protrusions 154 at the second end of the pipeline service saddle 150 forms a groove configured to receive a portion of the first end of the second strap 146 such that the protrusion 154 extends through the second slot 148 to secure the first end of the second strap 146 to the second end of the pipeline service saddle 150.

To use the over-center latch 144 to secure the system 136 to the pipeline 138, an operator can position the first strap 140 with the first aperture 142 surrounding the protrusion 152, such that the protrusion 152 extends through the aperture 142, and the second strap 146 with the second aperture 148 surrounding one of the protrusions 154, such that the one of the protrusions 154 extends through the aperture 148. The operator can then operate and close the over-center latch 144 to apply tension to the straps 140 and 146 and secure the system 136 to the pipeline 138. The plurality of protrusions 154 provide a first, coarse adjustment mechanism for the system 136, and the over-center latch 144 may provide a second, fine adjustment mechanism for the system 136.

The third system 136 also includes an interchangeable outlet nozzle assembly 158 mounted within the pipeline service saddle 150, through which fluids can travel into or out of the pipeline 138. The outlet nozzle assembly 158 includes an interchangeable outlet nozzle 160, a torque ring 162, a loading ring or bearing ring 164, a threaded base portion 166, into which the nozzle 160 can be threaded to secure the outlet nozzle assembly 158 to the pipeline service saddle 150, and a gasket 168 that creates a seal between the pipeline 138 and the outlet nozzle assembly 158. The gasket 168 may be an active gasket configured to create a seal that strengthens as fluid pressure against the gasket 168 increases, and may be configured to create a seal against fluid at pressures of up to 300 pounds per square inch. The outlet nozzle assembly 158 is advantageous at least because it allows the outlet nozzle 160 to be threaded out of the rest of the system 136, while leaving the rest of the system 136, including the rest of the outlet nozzle assembly 158, secured in place, so that the outlet nozzle 160 can be inspected, repaired, or replaced, such as with a different nozzle or a different fluid-carrying component. In alternative embodiments, a tapping sleeve may be provided with or combined with any of the features of the third system 136 illustrated in FIGS. 10-15.

Figure 16:
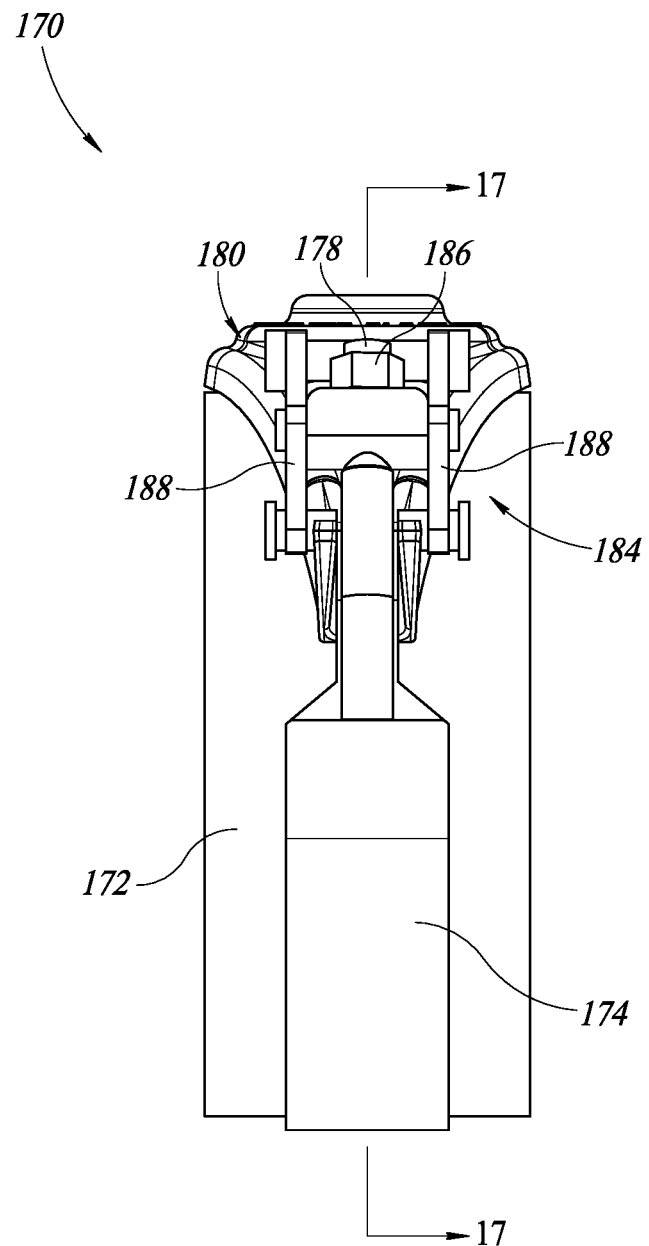
FIG. 16 illustrates a side view of a fourth system including a pipeline service saddle.
Figure 17:
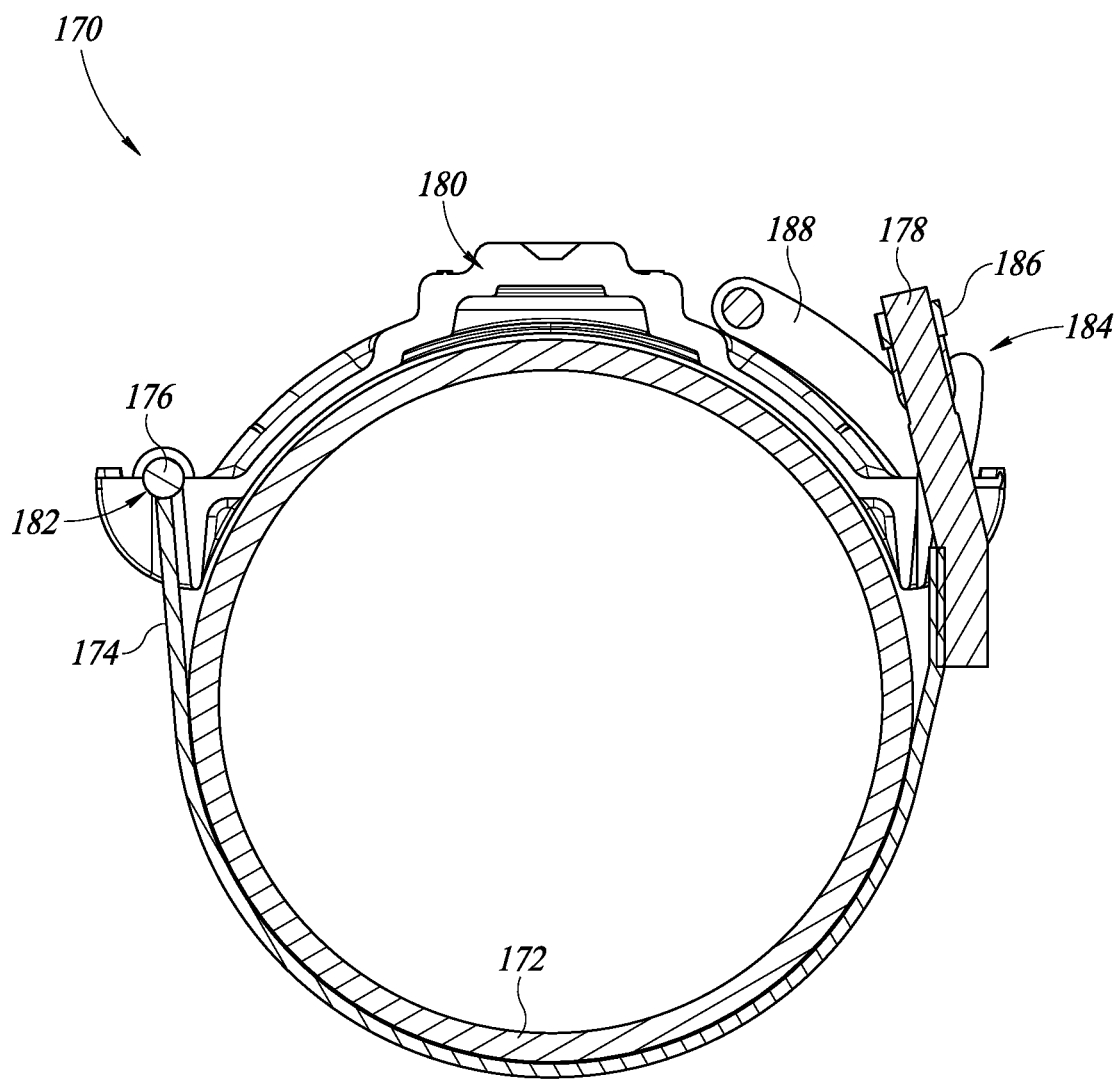
FIG. 17 illustrates a cross-sectional longitudinal end view, taken along line 17-17 illustrated in FIG. 16, of the system of FIG. 16.
Figure 18:
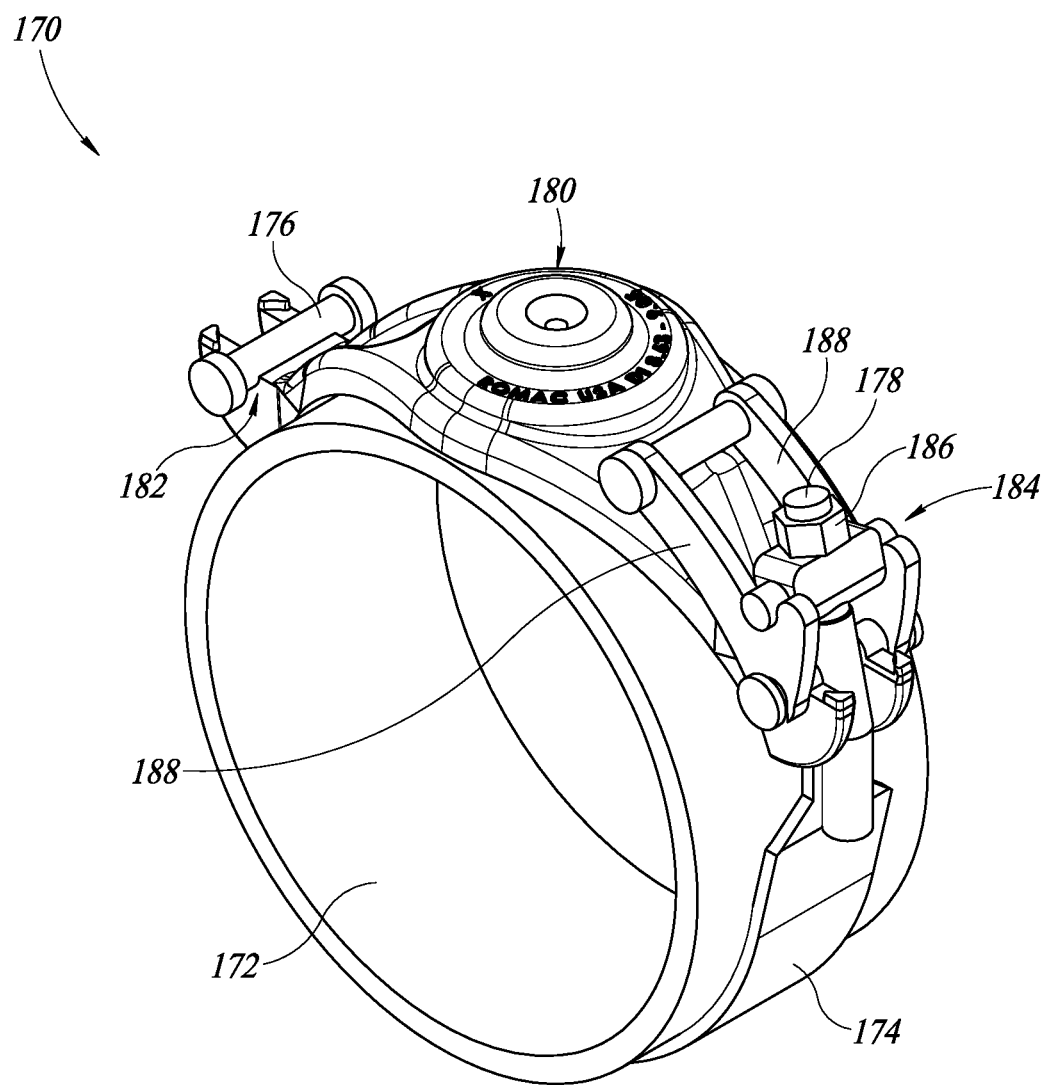
FIG. 18 illustrates a perspective view of the system of FIG. 16.

FIGS. 16-18 illustrate various views of a fourth system 170 mounted on, and encircling, a pipeline 172. The fourth system 170 includes a strap 174 having a first end including a bar 176 and a second end including a threaded end portion 178. The fourth system 170 also includes a pipeline service saddle 180 having a first end including one or more grooves 182 configured to receive the bar 176, and a second end including an over-center latch mechanism 184, wherein the over-center latch mechanism 184 includes a threaded nut 186 engaged with the threaded end portion 178 of the strap 174. The over-center latch mechanism 184 includes a lever 188 rotatably coupled at a first end thereof to a main body of the pipeline service saddle 180. The threaded nut 186 and threaded end portion 178 of the strap 174 may provide a first adjustment mechanism for the system 170, and the over-center latch mechanism 184 may provide a second adjustment mechanism for the system 170.

To use the over-center latch mechanism 184 to secure the system 170 to the pipeline 172, an operator can turn the threaded nut 186 about the threaded end portion 178 of the strap 174 to adjust an overall length or diameter of the system 170 prior to using the lever 188. The operator can then grasp the lever 188 at a second end thereof opposite to the first end thereof and pull toward the pipeline service saddle 180 and away from the strap 174. To release the over-center latch mechanism 184 to remove the system 170 from the pipeline 172, the operator can grasp the lever 188 at the second end thereof and pull toward the strap 174 and away from the pipeline service saddle 180. The threaded end portion 178 of the strap 174 and the threaded nut 186 of the over-center latch mechanism 184 can form a connection between the strap 174 and the pipeline service saddle 180.

In alternative embodiments, a tapping sleeve may be provided with or combined with any of the features of the fourth system 170 illustrated in FIGS. 16-18.

Figures 19, 20:
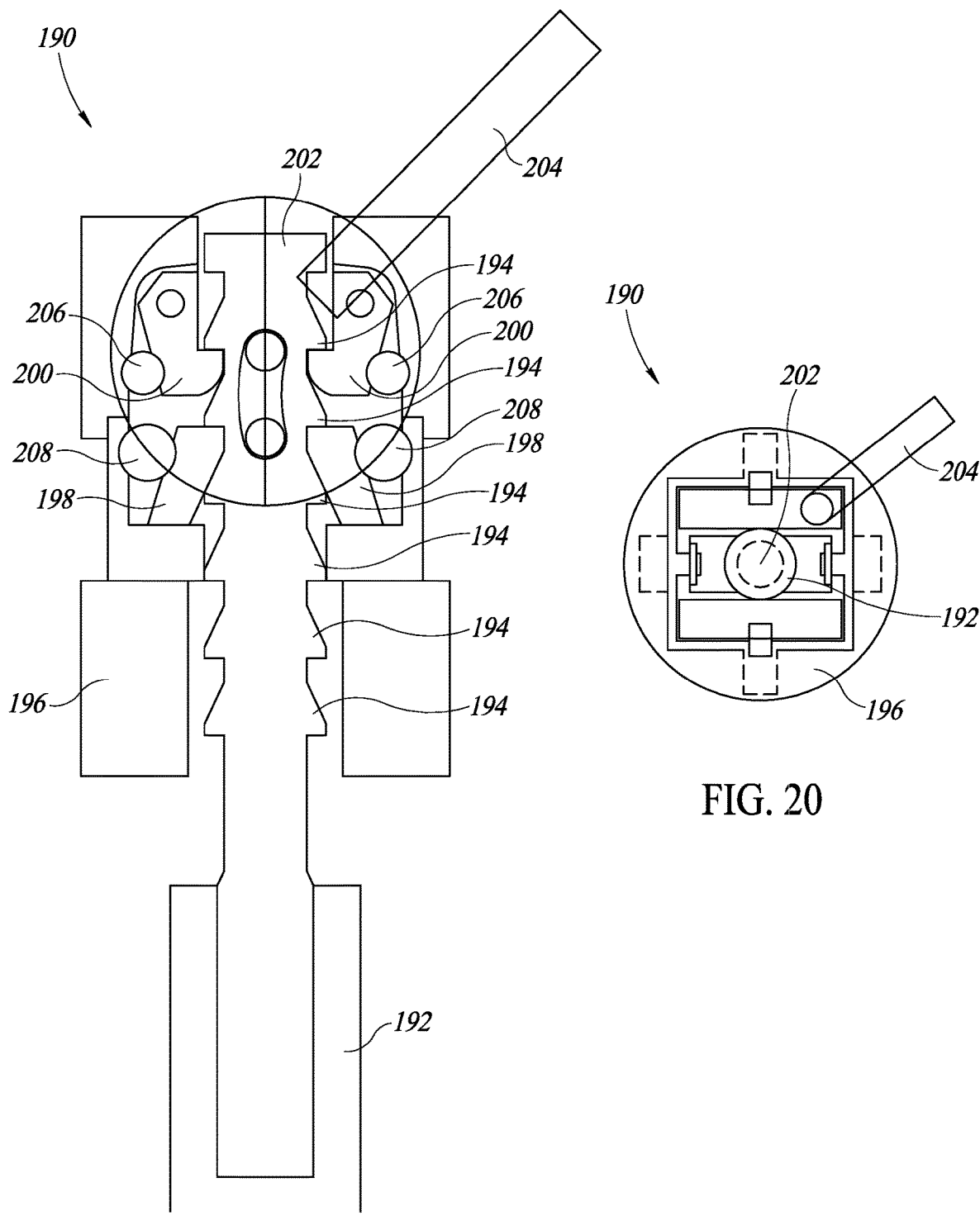
FIG. 19 illustrates a side view of a connection mechanism of a fifth system including a pipeline service saddle.
FIG. 20 illustrates an end view of the connection mechanism of the fifth system illustrated in FIG. 19.

FIGS. 19 and 20 illustrate various views of portions of a fifth system 190 including a strap 192 having a plurality of teeth or serrations 194 and a pipeline service saddle 196 having a plurality of catch mechanisms 198 and a plurality of pull mechanisms 200, where both the catch mechanisms 198 and the pull mechanisms 200 are configured to engage the portion of the strap 192 including the teeth or serrations 194. Together, the serrations 194, the plurality of catch mechanisms 198, and the plurality of pull mechanisms 200 create a connection between the strap 192 and the pipeline service saddle 196. In some embodiments, this connection may replace any of the other connections between straps and pipeline service saddles described elsewhere herein. Each of the serrations 194 has a variable-diameter surface that decreases in diameter toward a closest terminal end portion 202 of the strap 192 and a radially-extending surface that extends radially from a widest portion of one serration to a narrowest portion of an adjacent serration. Each of the catch mechanisms 198 and each of the pull mechanisms 200 abut against one of the radially-extending surfaces.

In use, an operator can grasp and pull on a lever 204 coupled to the pull mechanisms 200 to cause the pull mechanisms 200 to rotate about respective locations where they engage a first O-ring gasket 206 and pull on at least one of the radially-extending surfaces to force the strap 192 to move toward the pipeline service saddle 196 and in the direction of its terminal end portion 202. As the strap 192 moves in this manner, the catch mechanisms 198 are forced to rotate about respective locations where they engage a second O-ring gasket 208 until the catch mechanisms 198 catch on and engage the next one of the radially-extending surfaces, at which point the catch mechanisms 198 rotate back to their original positions and orientations. The operator can then push the lever 204 back to its original position and orientation to cause the pull mechanisms 200 to rotate back to their original positions and orientations. This process can be repeated by the operator until a desired tightness has been achieved. In this manner, the teeth or serrations 194 provide a coarse adjustment mechanism for the system 190. In alternative embodiments, a tapping sleeve may be provided with or combined with any of the features of the fifth system 190 illustrated in FIGS. 19-20.

U.S. provisional patent application No. 62/953,846, filed Dec. 26, 2019, and U.S. provisional patent application No. 62/959,098, filed Jan. 9, 2020, are both hereby incorporated herein by reference, in their entireties. The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system coupled to a pipeline, the system comprising:
a first portion and a second portion coupled to the first portion by an over-center latch such that the system extends around the pipeline; and
an adjustment mechanism configured to adjust a connection of the second portion to the first portion,
wherein the first portion is a tapped or non-tapped service saddle configured to create a seal against the pipeline, and
wherein a dimension of the system can be adjusted by the adjustment mechanism independently of the over-center latch.

2. The system of claim 1 wherein the system includes a tapping sleeve.

3. The system of claim 1 wherein the service saddle has a first end portion and a second end portion opposite to the first end portion of the service saddle and the second portion of the system is a strap having a first end portion and a second end portion opposite to the first end portion of the strap, wherein the first end portion of the strap is coupled to the first end portion of the service saddle and the second end portion of the strap is coupled to the second end portion of the service saddle by the over-center latch.

4. The system of claim 3 wherein the first end portion of the service saddle includes a groove and the first end portion of the strap includes a rod positioned in the groove.

5. The system of claim 3 wherein the first end portion of the service saddle includes a fork and the first end portion of the strap includes a bolt that extends through the fork.

6. The system of claim 3 wherein the second end portion of the strap is coupled to the second end portion of the service saddle by the over-center latch and a ratchet.

7. The system of claim 3 wherein the second end portion of the service saddle includes a first aperture and the second end portion of the strap extends though the first aperture.

8. The system of claim 7 wherein the first aperture has a variable diameter that increases toward the second end portion of the service saddle.

9. The system of claim 8 wherein a portion of the strap located inside the first aperture has a variable diameter that decreases toward the second end portion of the strap.

10. The system of claim 9, further comprising a lever assembly including a lever rotatably coupled to the second end portion of the service saddle and a second aperture rotatably coupled to the lever, wherein the second end portion of the strap extends through the second aperture.

11. The system of claim 10 wherein the second aperture has a variable diameter that increases toward the second end portion of the service saddle.

12. The system of claim 11 wherein a portion of the strap located inside the second aperture has a variable diameter that decreases toward the second end portion of the strap.

13. The system of claim 3 wherein the second end portion of the strap is serrated.

14. The system of claim 3 wherein the second end portion of the strap is saw-toothed.

15. The system of claim 3, further comprising a lever assembly including a lever rotatably coupled to the second end portion of the service saddle and bar rotatably coupled to the lever.

16. The system of claim 15 wherein the second end portion of the strap includes a groove and the bar is located within the groove.

17. The system of claim 15 wherein the second end portion of the strap includes a plurality of grooves and the bar is located within one of the grooves.

18. The system of claim 3, further comprising a lever assembly including a lever rotatably coupled to the second end portion of the service saddle and an aperture rotatably coupled to the lever, wherein the second end portion of the strap extends through the aperture.

19. The system of claim 18 wherein the second end portion of the strap includes a flange that prevents the second end portion of the strap from moving through the aperture in a direction toward the second end portion of the service saddle.

20. The system of claim 1, wherein the pipeline is a water main.

21. The system of claim 1, wherein the dimension of the system is a diameter of the system.

* * * * *